(12) United States Patent
Shimada et al.

(10) Patent No.: US 9,122,435 B2
(45) Date of Patent: Sep. 1, 2015

(54) PRINTING APPARATUS, PRINT CONTROL SYSTEM, AND METHOD FOR CONTROLLING PRINT CONTROL SYSTEM

(75) Inventors: Bungo Shimada, Tokyo (JP); Yoshiharu Ikegawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 775 days.

(21) Appl. No.: 13/293,452

(22) Filed: Nov. 10, 2011

(65) Prior Publication Data

US 2012/0148323 A1 Jun. 14, 2012

(30) Foreign Application Priority Data

Dec. 14, 2010 (JP) ................................. 2010-278559

(51) Int. Cl.
*B41J 11/44* (2006.01)
*G06F 3/12* (2006.01)
*G06F 21/60* (2013.01)

(52) U.S. Cl.
CPC .............. *G06F 3/1285* (2013.01); *G06F 3/122* (2013.01); *G06F 3/1204* (2013.01); *G06F 3/1238* (2013.01); *G06F 3/1267* (2013.01); *G06F 21/608* (2013.01)

(58) Field of Classification Search
USPC .......................................................... 400/76
See application file for complete search history.

(56) References Cited

U.S. PATENT DOCUMENTS

| | | | |
|---|---|---|---|
| 6,609,115 B1* | 8/2003 | Mehring et al. | 705/51 |
| 7,657,610 B2* | 2/2010 | Takahashi et al. | 709/219 |
| 7,757,093 B2* | 7/2010 | Hibino et al. | 713/182 |
| 8,792,110 B2* | 7/2014 | Moore | 358/1.14 |
| 2001/0050781 A1* | 12/2001 | Kujirai | 358/1.15 |
| 2002/0051577 A1* | 5/2002 | Kinjo | 382/218 |
| 2002/0181006 A1* | 12/2002 | Chrisop et al. | 358/1.14 |
| 2007/0195360 A1* | 8/2007 | Sagata | 358/1.15 |
| 2010/0214600 A1* | 8/2010 | Yagi | 358/1.15 |

FOREIGN PATENT DOCUMENTS

| | | |
|---|---|---|
| CN | 1417676 A | 5/2003 |
| EP | 1217509 A2 | 6/2002 |
| JP | H11-301040 A | 11/1999 |
| JP | 11-353137 A | 12/1999 |
| JP | 2000-155654 A | 6/2000 |
| JP | 2001-026166 A | 1/2001 |
| JP | 2001-216125 A | 8/2001 |
| JP | 2002-287932 A | 10/2002 |

* cited by examiner

*Primary Examiner* — Anthony Nguyen
(74) *Attorney, Agent, or Firm* — Canon USA, Inc., IP Division

(57) ABSTRACT

A host computer transmits a plurality of print data pieces to which an identical password is added to a printing apparatus. The printing apparatus includes a unit configured to receive and store one of the transmitted plurality of print data pieces, an operation unit configured to accept input of a password from a user, an image formation unit configured to perform, when the password input from the user and the password added to the stored print data match each other, image formation based on the print data to which the identical password to the input password is added, and a control unit configured to cause, when it receives the remaining one of the transmitted plurality of print data pieces after the image formation has been performed, the image formation unit to perform the image formation based on the remaining print data without making the user input the password again.

10 Claims, 13 Drawing Sheets

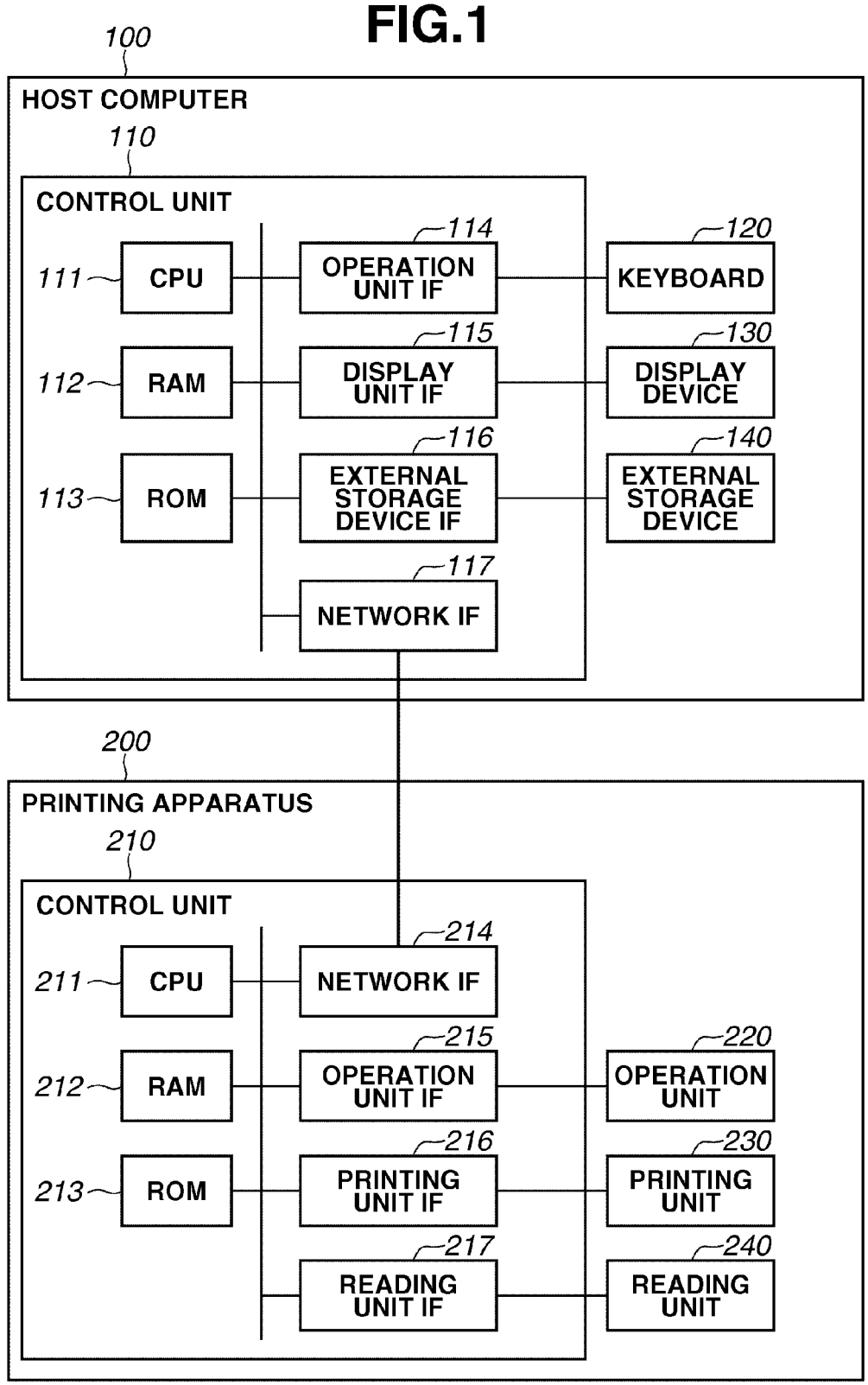

FIG.2

| PROPERTY OF PRINTER-XX03 | |
|---|---|
| 201 — JOB TYPE: | ○ PRINT  ◎ SECURE PRINT |
| 202 — NUMBER OF COPIES: | 5 |
| 203 — PAGE LAYOUT: | 4 PAGES/SHEET ▽ |
| 204 — ARRANGEMENT ORDER: | RIGHTWARD FROM TOP LEFT ▽ |
| 205 — PRINTING METHOD: | ○ ONE-SIDED PRINTING  ◎ TWO-SIDED PRINTING  ○ BOOKBINDING PRINTING |
| 206 — BINDING DIRECTION: | LONG-SIDED BINDING (LEFT) ▽ |
| 207 — SHEET DISCHARGING METHOD: | ○ NOT DESIGNATED  ◎ SORT  ○ STAPLE |
| 208 — SHEET FEEDING UNIT: | ◎ AUTOMATIC  ○ MANUAL FEED TRAY  ○ CASSETTE 1  ○ CASSETTE 2 |

OK    CANCEL

FIG.3

| CONFIRM PASSWORD | | |
|---|---|---|
| DOCUMENT NAME: | 4/1 HANDOUT | ~301 |
| USER NAME: | suzuki | ~302 |
| PASSWORD: | 1234567 | ~303 |
| | OK | CANCEL |

FIG.4

| 401 | 402 | 403 | 404 |
|---|---|---|---|
| PRINT JOB ID | DOCUMENT NAME | USER NAME | DATA SIZE |
| 1 | 4/1 HANDOUT | suzuki | 972 kB |
| 2 | 4/1 HANDOUT | suzuki | 972 kB |
| 3 | 4/1 HANDOUT | suzuki | 972 kB |
| 4 | 4/1 HANDOUT | suzuki | 972 kB |
| 5 | 4/1 HANDOUT | suzuki | 972 kB |

FIG.8

| SECURE PRINT JOB ID | DOCUMENT NAME | USER NAME | PASSWORD | RECEPTION TIME | STATUS | ELAPSED TIME |
|---|---|---|---|---|---|---|
| 1 | PRESENTATION MATERIAL 1 | yamada | **** | 14:38 | EXPIRED | 15 (MIN) |
| 2 | PRESENTATION MATERIAL 2 | tanaka | ****** | 14:40 | STOP | 9 (MIN) |
| 3 | PRESENTATION MATERIAL 3 | tanaka | **** | 14:41 | AUTHENTICATED | 7 (MIN) |
| 4 | 4/1 HANDOUT | suzuki | ******** | 14:45 | AUTHENTICATION WAIT | — |
| 5 | 4/1 HANDOUT | suzuki | ******** | 14:45 | AUTHENTICATION WAIT | — |
| 6 | 4/1 HANDOUT | suzuki | ******* | 14:45 | AUTHENTICATION WAIT | — |

801  802  803  804  805  806  807

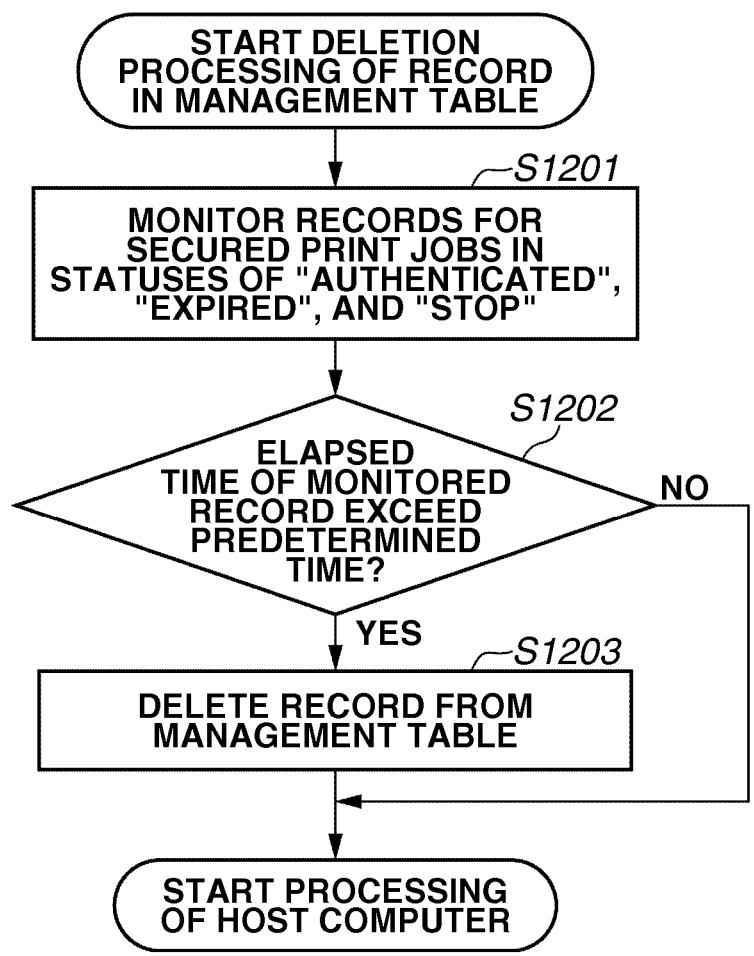

PRINTING APPARATUS, PRINT CONTROL SYSTEM, AND METHOD FOR CONTROLLING PRINT CONTROL SYSTEM

BACKGROUND OF THE INVENTION

1. Field of the Invention

The present invention relates to a printing apparatus configured to reserve print data transmitted from a host computer and print the print data in response to acceptance of an operation via an operation unit in the printing apparatus from a user, and a print control system.

2. Description of the Related Art

A print control system has been known in which a printing apparatus stores print data transmitted from a host computer such as a personal computer (PC) without immediately printing the print data and which performs print processing when a user performs an operation for performing printing in front of the printing apparatus. In such a print control system, when the user inputs a correct password or the like on an operation screen of the printing apparatus, printing based on the print data can be performed. Such a print control system is effective when a user uses the printing apparatus, which is a common printer connected to a network, and does not desire others to see a print product.

The host computer may designate the number of print copies of a print product and sorting processing (processing for discharging the print products to a sheet discharge unit in the printing apparatus while sorting the print products by the number of print copies) to issue an instruction to perform printing. In this case, if the printing apparatus performs the sorting processing, images on all pages included in the print data are required to be stored in a memory of the printing apparatus, and the memory of the printing apparatus may be weighed down by the data. If the printing apparatus has a limited memory capacity for storing print data, therefore, a method for transmitting and receiving print data has been known, as discussed in Japanese Patent Application Laid-Open No. 2001-216125. According to Japanese Patent Application Laid-Open No. 2001-216125, a host computer generates a plurality of print data pieces by the designated number of print copies, and the generated print data pieces are sequentially transmitted from the host computer to a printing apparatus. When the print data pieces generated by the number of print copies are thus sequentially transmitted to the printing apparatus, all image data pieces on the first page to the final page are not required to be cached in the memory of the printing apparatus.

If the plurality of print data pieces generated by the number of print copies is transmitted to the printing apparatus and is reserved in the printing apparatus, as discussed in Japanese Patent Application Laid-Open No. 2001-216125, the generated print data pieces are required to be transmitted after adding an identical password thereto. A system including a host computer configured to sequentially transmits to the printing apparatus a plurality of print data pieces, to which an identical password is added and which is generated by the number of print copies, and a printing apparatus having a limited memory capacity for reserving the transmitted print data has the following issue. When the host computer transmits print data pieces exceeding the capacity that the memory of the printing apparatus can reserve, the host computer waits until the memory of the printing apparatus becomes empty to transmit the print data beyond the limited memory. At this time, at least one of the plurality of print data pieces generated by the host computer is reserved in the printing apparatus, and the remaining print data pieces are reserved in the host computer (the transmission of the print data is waited for).

In such a state, when a user inputs a correct password on an operation screen of the printing apparatus to perform a predetermined printing operation, printing based on the print data stored in the printing apparatus is performed. When the printing ends, the print data stored in the printing apparatus is erased. When the print data is erased, the remaining print data that waits in the host computer is transmitted to the printing apparatus. The remaining print data that has been transmitted is stored in the printing apparatus, and continues to be stored in the printing apparatus until the password is input again. In such a case, even if the print processing is based on the print data pieces to which the identical password is added, a series of processing from input of the correct password in the printing apparatus to printing based on the print data is intermittently performed multiple times. In addition, the user needs to input the password many times in the printing apparatus, so that the usability is not good for the user.

A similar issue also occurs when an event to erase print data stored in the printing apparatus (e.g., an event to erase print data when a time-out time has elapsed or an instruction to erase a job by a user) is generated. When the event to erase the print data occurs, the event to erase the print data is inefficiently generated many times.

SUMMARY OF THE INVENTION

The present invention is directed to means configured to collectively process, when a host computer transmits a plurality of print data pieces generated based on a single instruction, all of the transmitted plurality of print data pieces.

According to an aspect of the present invention, a print control system including a host computer and a printing apparatus, in which the host computer includes an acceptance unit configured to accept an instruction to print data generated by an application, and a transmission unit configured to transmit a plurality of print data pieces to which an identical password is added based on the instruction accepted by the acceptance unit, and the printing apparatus includes a reception unit configured to receive at least one of the plurality of print data pieces transmitted by the transmission unit, a storage unit configured to store the print data received by the reception unit, an operation unit configured to accept input of a password from a user, an image formation unit configured to perform, in response to matching between the password input from the user via the operation unit and the password added to the print data stored in the storage unit, image formation based on the print data to which the identical password to the input password is added, and a control unit configured to cause, after a password identical to the password added to the print data stored in the storage unit is input via the operation unit, the image formation unit to perform, if the reception unit receives the print data to which the identical password to the input password is added, image formation based on the received print data without making the user input the password again via the operation unit.

According to the present invention, when the host computer transmits the plurality of print data pieces to which the identical password is added, time and labor required for a user to input a password a plurality of numbers of times can be reduced in the printing apparatus.

Further, according to the present invention, when the host computer transmits a plurality of print data pieces generated based on a single instruction, the plurality of print data pieces can be collectively erased based on an event to erase the print data generated in the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration of a print control system including a host computer and a printing apparatus according to an exemplary embodiment.

FIG. 2 illustrates a screen for issuing an instruction to perform printing in the host computer illustrated in FIG. 1.

FIG. 3 illustrates a screen for setting a document name, a user name, and a password when secure printing is designated on the screen illustrated in FIG. 2.

FIG. 4 illustrates a table indicating statuses of print data pieces stored in the host computer illustrated in FIG. 1.

FIG. 8 schematically illustrates a management table for managing secure print jobs, which is managed by the printing apparatus illustrated in FIG. 1.

FIG. 12 is a flowchart illustrating processing for deleting a record in the management table for managing the secure print job illustrated in FIG. 8.

DESCRIPTION OF THE EMBODIMENTS

Figure 5:
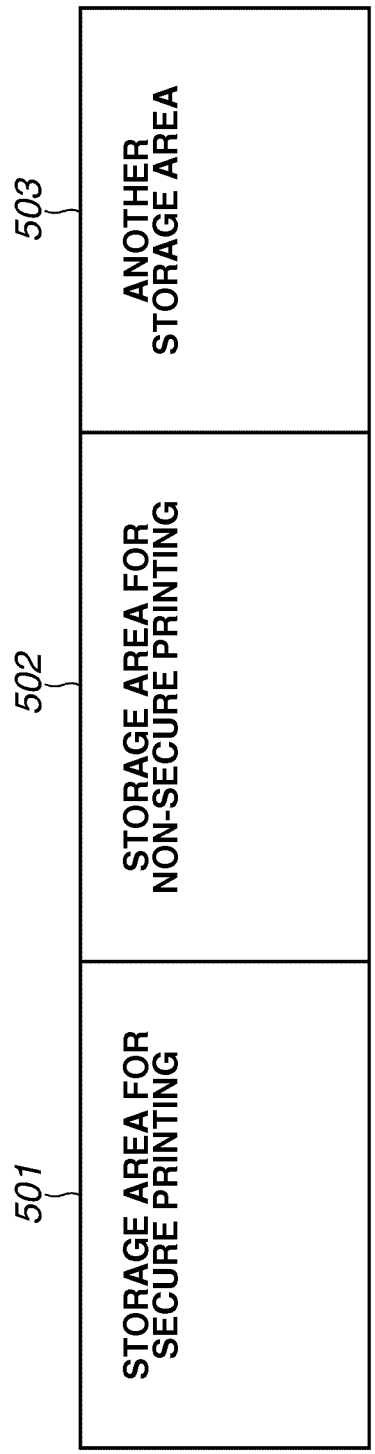
FIG. 5 illustrates storage areas of a random access memory (RAM) in the printing apparatus illustrated in FIG. 1.

Various exemplary embodiments, features, and aspects of the invention will be described in detail below with reference to the drawings.

FIG. 1 illustrates a configuration of a print control system according to an exemplary embodiment. As illustrated in FIG. 1, a host computer 100 and a printing apparatus 200 are connected to a network, and can communicate with each other. The host computer 100 includes a control unit 110, a keyboard 120, a display device 130, and an external storage device 140. The control unit 110 includes a central processing unit (CPU) 111 configured to execute document processing based on a program stored in a read-only memory (ROM) 113 or a program (or an application) stored in an external memory. The ROM 113 stores an operating system (hereinafter referred to as an OS) serving as a control program of the CPU 111. A random access memory (RAM) 112 functions as a main memory or a work area of the CPU 111.

An operation unit interface 114 controls key input from the keyboard 120 or a pointing device (not illustrated). A display unit interface 115 controls display on the display device 130 such as a liquid crystal display or a cathode ray tube (CRT) display. An external storage device interface 116 controls access of the external storage device 140. The external storage device 140 stores a boot program, various types of applications, font data, a user file, an editing file, and a printer control command generation program (hereinafter referred to as a printer driver). The external storage device 140 includes a region such as a spooler for managing print data generated by the printer driver in the host computer 100. An example of the external storage device 140 is a hard disk (HD) or a solid state drive (SSD). A network interface 117 connects the network and the printing apparatus 200, and performs communication control processing for the printing apparatus 200.

The CPU 111 opens various types of registered windows based on a command designated by a mouse cursor (not illustrated) displayed on an operation screen of the display device 130, and executes various types of data processing. A user can perform setting of a printer and setting of a print processing method for a printer driver including selection of a print mode by opening the window relating to print setting in performing printing.

A hardware configuration of the printing apparatus 200 will be described below with reference to FIG. 1. The printing apparatus 200 includes a control unit 210, an operation unit 220, a printing unit 230, and a reading unit 240. The control unit 210 includes a CPU 211, and controls the printing apparatus 200. The CPU 211 performs print processing based on a control program stored in a ROM 213.

The CPU 211 communicates with the host computer 100 via a network interface 214, and notifies the host computer 100 of information in the printing apparatus 200. A RAM 212 functions as a main memory or a work area of the CPU 211. The RAM 212 is used as an output information rasterization area, an environmental data storage area, a nonvolatile random access memory (VRAM), or the like. An operation unit interface 215 controls key input from the operation unit 220. The operation unit 220 includes a switch for turning on and off a power supply, a light emitting diode (LED) display, and various types of keys for receiving an operation by the user. A printing unit interface 216 controls the printing unit 230 that prints a bit map image output from the control unit 210. A reading unit interface 217 controls the reading unit 240 that reads a document image.

FIG. 2 illustrates an example of an operation screen displayed on the display device 130 in the host computer 100. The operation screen illustrated in FIG. 2 is a screen displayed by a printer driver dedicated to the printing apparatus 200, which is stored in the external storage device 140. A job type 201 is an item for designating an attribute to a job type. Either "print" or "secure print" can be designated. A number of copies 202 is an item for designating the number of print copies of a print product. In addition, the following items are designated, such as a page layout 203 (one page per sheet, two pages per sheet, or four pages per sheet), an arrangement order 204 (rightward from top left, downward from top left, leftward from top right, or downward from top right), a printing method 205 (one-sided printing, two-sided printing, or bookbinding printing), and a binding direction 206 (long-side binding or short-side binding). Further, as a sheet discharging method 207, anyone of "not designated", "sort" and "staple" is designated. "Sort" in the present exemplary embodiment is a function of discharging the print product to a sheet discharge unit (not illustrated) in the printing apparatus 200 by the number of print copies designated in the number of copies 202. "Staple" is a function of printing the print product by the number of print copies, as described above, further subjecting the print product to stapling, and discharging the print product to the sheet discharge unit in the printing apparatus 200.

FIG. 3 illustrates a setting screen displayed when "secure print" is designated in the job type 201 arranged on the screen illustrated in FIG. 2. The setting screen illustrated in FIG. 3 is displayed by the printer driver, similarly to the screen illustrated in FIG. 2. On this screen, a document name, a user name, and a password are set. The document name is input in an area 301. As an initial state, a file name of data generated by the application in the host computer 100 is automatically set. The user name is input in an area 302. As an initial state, a log-in name of a user who logs into the host computer 100 is set. The document name and the user name to be input can be freely edited. The password is input in an area 303. When the user presses an OK button while values are respectively input in the areas 301 to 303, the host computer 100 transmits a print job relating to print data, to which the document name, the user name, and the password are added, to the printing apparatus 200.

The print job in the present exemplary embodiment is a job for printing an image based on print data described in a page description language (PDL). The print job is further classified into a "secure print job" and a "non-secure print job". The secure print job is a job for performing printing when the host computer 100 transmits print data by adding a password of the user thereto, and the user inputs a correct password via the operation unit 220 in the printing apparatus 200. The non-secure print job is a print job other than the above-described secure print job.

FIG. 4 illustrates a data table of print jobs stored in the spooler in the host computer 100. A print job identification (ID) 401 is an identifier for identifying the print job stored in the spooler. A document name 402 represents the document name input in the area 301. A user name 403 represents the user name input in the area 302. A data size 404 represents a data size of the print data. In the example illustrated in FIG. 4, print data with a document name "4/1 handout" and a user name "suzuki" are stored in the spooler. When "sort" is designated as the sheet discharging method 207, and "5" is designated as the number of copies 202, five print jobs are generated, as illustrated in FIG. 4. The generated print jobs are sequentially transmitted to the printing apparatus 200. If a memory of the printing apparatus 200 is full, transmission of the print data is waited for until the memory becomes empty.

FIG. 5 illustrates storage areas of the RAM 212 in the printing apparatus 200. In the printing apparatus 200 according to the present exemplary embodiment, the RAM 212 is assigned special storage areas illustrated in FIG. 5 in addition to the above-described storage area used as the main memory or the work area in the CPU 211. A storage area 501 for secure printing is an area exclusively assigned to retain print data relating to a secure print job until password authentication is performed. A memory capacity of the storage area 501 for secure printing can be variably set in an operation by a user or an administrator of the operation unit 220. The larger the memory capacity of the storage area 501 for secure printing is made, the more print data pieces relating to secure print jobs can be retained in the printing apparatus 200. In that case, the print data pieces relating to the secure print jobs may occupy the whole memory capacity of the RAM 212.

A storage area 502 for non-secure printing is an area used when print data relating to a non-secure print job is received and printed. The storage area 502 is used to store and rasterize the received print data. The storage area 502 for non-secure printing is not necessarily used only when the non-secure print job is executed. The storage area 502 is also used when image formation based on print data with an authenticated password is performed after password authentication is performed for the secure print job. Further, the storage area 502 is also used when a job other than the print job, e.g., a copy job or an image transmission job is executed.

The storage area 501 for secure printing and the storage area 502 for non-secure printing may be physically distinguished, or may be managed by logically assigning memory addresses thereto.

Another storage area 503 stores information such as a document name, a user name, and a password, which have been received together with the print data from the host computer 100 by associating with the print data.

Figure 6:
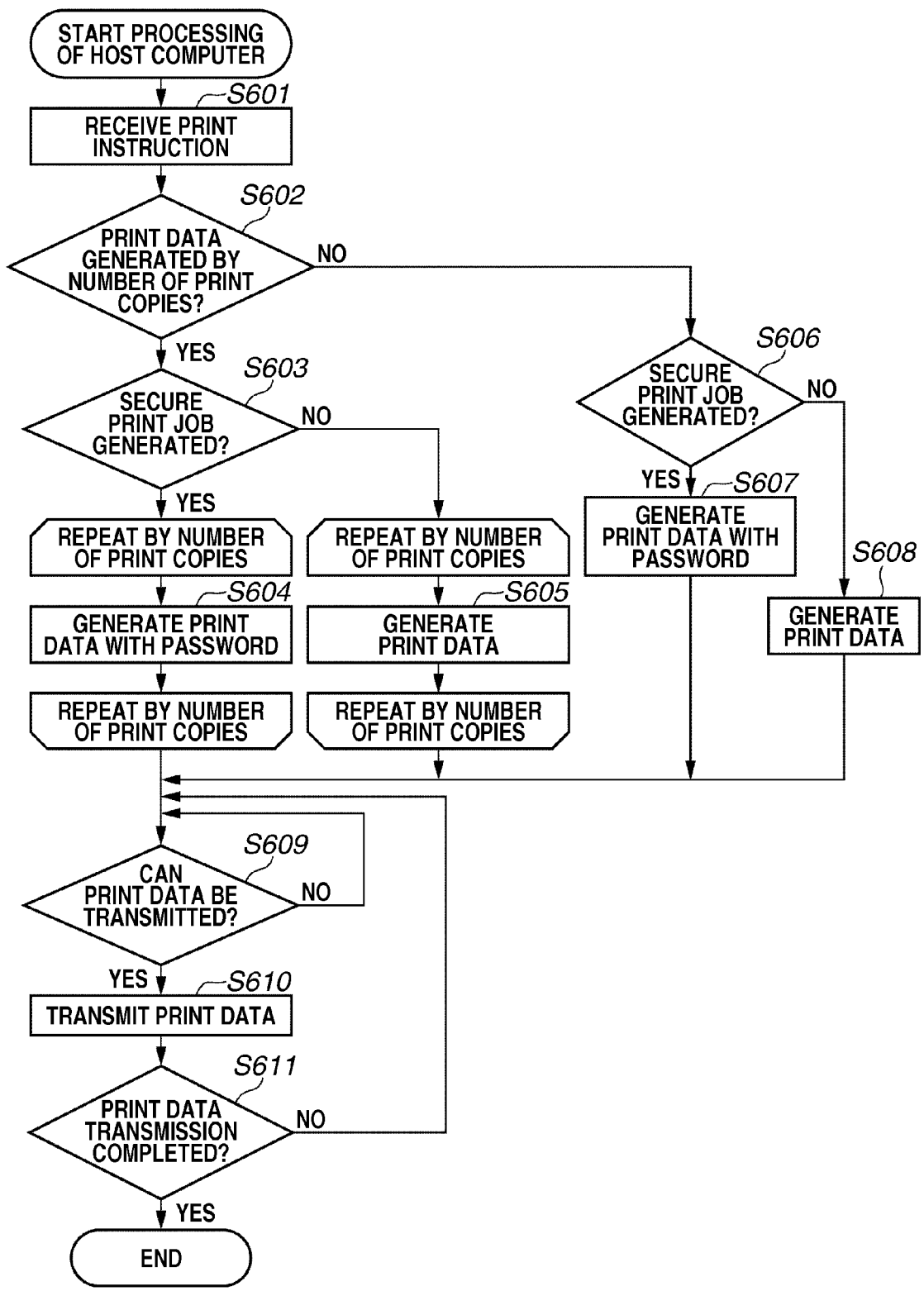
FIG. 6 is a flowchart illustrating print processing in the host computer illustrated in FIG. 1.

FIG. 6 is a flowchart illustrating print processing in the host computer 100. Processing in each step illustrated in FIG. 6 is implemented when the CPU 111 executes a program stored in the external storage device 140. The flowchart illustrated in FIG. 6 is started when a print instruction is accepted via the operation screen of the host computer 100.

In step S601, the CPU 111 in the host computer 100 accepts an instruction to print data generated by an application. The accepted print instruction includes values in the items 201 to 208, which are set by the user on the screens illustrated in FIGS. 2 and 3. While various setting values are included in addition to the above-described values in the print instruction, the setting values are not related to the essence of the present exemplary embodiment, and hence are omitted.

In step S602, the CPU 111 analyzes the print setting included in the print instruction, which is accepted in step S601, and determines whether print data is generated by the number of print copies. The determination is made based on the value in the sheet discharging method 207 in the print setting. In the present exemplary embodiment, if either "sort" or "staple" is selected in the sheet discharging method 207 in the print setting, for example, it is determined that the print data is generated by the number of print copies (YES in step S602). On the other hand, if "not designated" is selected in the sheet discharging method 207, it is determined that the print data is not generated by the number of print copies (NO in step S602). Even if neither "sort" nor "staple" is selected in the sheet discharging method 207 in the print setting, it may be specified that the print data is generated by the number of print copies as an initial value. In such a case, it is determined that the print data is generated by the number of print copies (YES in step S602).

In step S603, the CPU 111 analyzes the print setting included in the print instruction, which is accepted in step S601, and determines whether a secure print job is generated or a non-secure print job is generated. The determination is performed based on the value in the job type 201 in the print setting. If "print" is selected in the job type 201, it is determined that the non-secure print job is generated (NO in step S603). Whereas if "secure print" is selected, it is determined that the secure print job is generated (YES in step S603).

In step S604, the CPU 111 generates print data with a password from the data generated by the application. In the present exemplary embodiment, the print data with the password means print data to which a password input on the screen illustrated in FIG. 3 is added.

The processing in step S604 is repeated by the number of print copies included in the print instruction accepted in step S601. Therefore, the print data with the password, which is generated in step S604, is generated by the number designated in the number of copies 202. When the user issues an instruction to make "5" copies of a print product on the screen illustrated in FIG. 2 and sets a password on the screen illustrated in FIG. 3, for example, five print data pieces to which the set password is added are generated, and a print job is input into the spooler in the host computer 100.

Processing in step S605 is performed when it is determined that the non-secure print job is generated in step S603. In step S605, the CPU 111 generates the print data by the number of print copies designated in the number of copies 202, like in step S604, and inputs a print job relating to the generated print data into the spooler.

In step S606, the CPU 111 determines whether "secure print" is designated in the print setting included in the print instruction, which has been accepted in step S603. The determination in step S606 is similar to the determination in step S603, and hence the description thereof is not repeated.

In step S607, the CPU 111 generates print data with a password relating to the secure print job. The CPU 111 generates print data by adding the value designated in the number of copies 202 included in the print instruction accepted in step S601 and the password thereto. In this processing, the CPU 111 generates print data relating to one secure print job regardless of the designation in the number of copies 202, unlike processes in steps S604 and S605.

In step S608, the CPU 111 generates print data relating to the non-secure print job. The CPU 111 adds the designation in the number of copies 202, and generates the print data relating to one non-secure print job.

In step S609, the CPU 111 monitors a packet, which is transmitted or received by the network interface 117, and determines whether the print data can be transmitted to the printing apparatus 200. For example, the CPU 111 determines whether the memory of the printing apparatus 200 is full or the print data cannot be transmitted because the printing apparatus 200 is in a busy state. If the CPU 111 determines that the print data cannot be transmitted (NO in step S609), the CPU 111 waits until the print data can be transmitted.

If the CPU 111 determines that the print data can be transmitted (YES in step S609), then in step S610, the CPU 111 sequentially transmits the print data. The processing in steps S609 and S610 are repeated until the CPU 111 finishes transmitting the print data pieces relating to the generated job. If a plurality of print jobs is input into the spooler, as illustrated in FIG. 4, the processing is repeated until the print data pieces relating to all the print jobs are transmitted. If the CPU 111 finishes transmitting all the print data pieces to the printing apparatus 200 (YES in step S611), the processing illustrated in the flowchart in FIG. 6 ends.

Figure 7A:
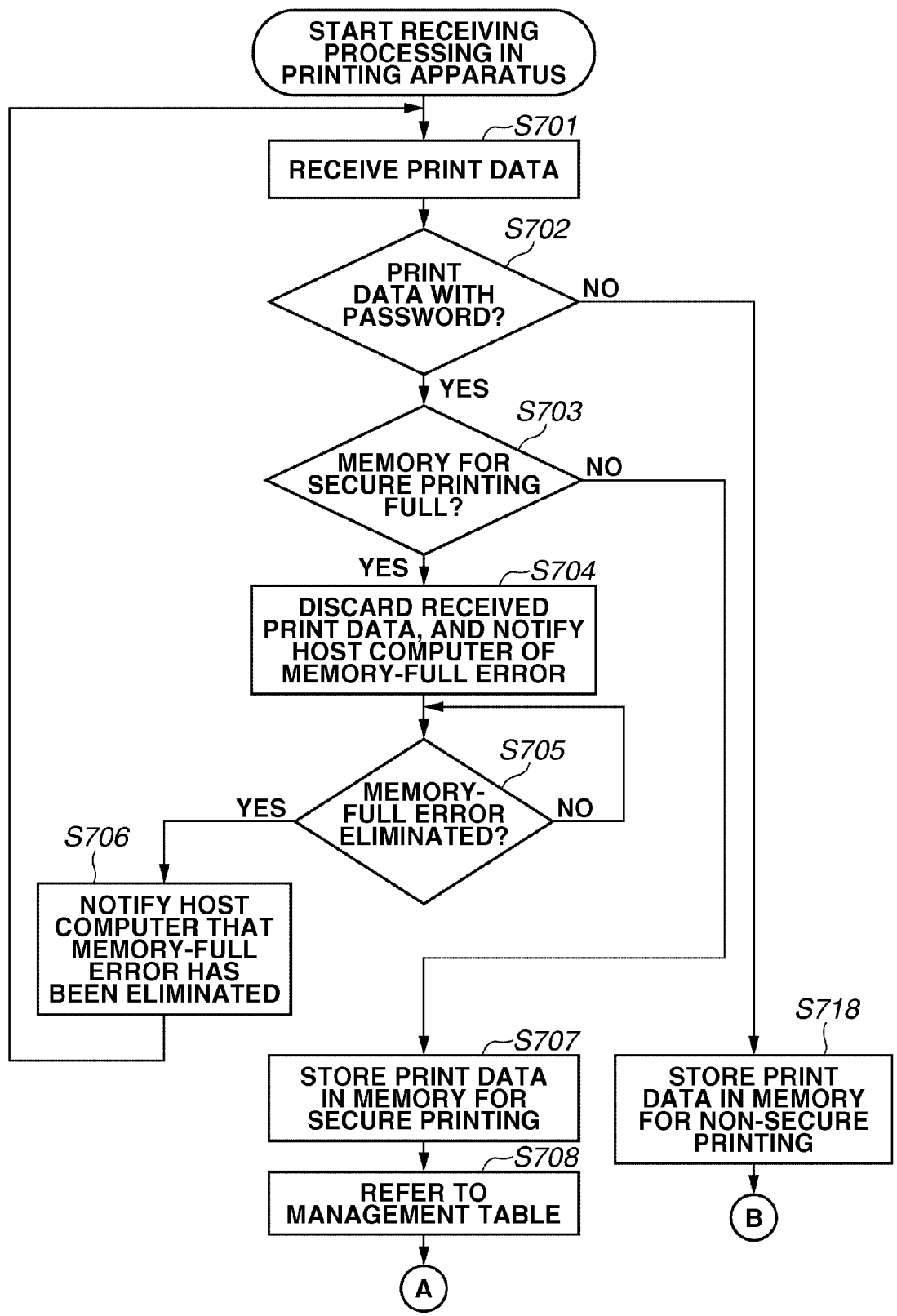
FIGS. 7A and 7B are flowcharts illustrating print processing of print data received by the printing apparatus illustrated in FIG. 1.
Figure 7B:
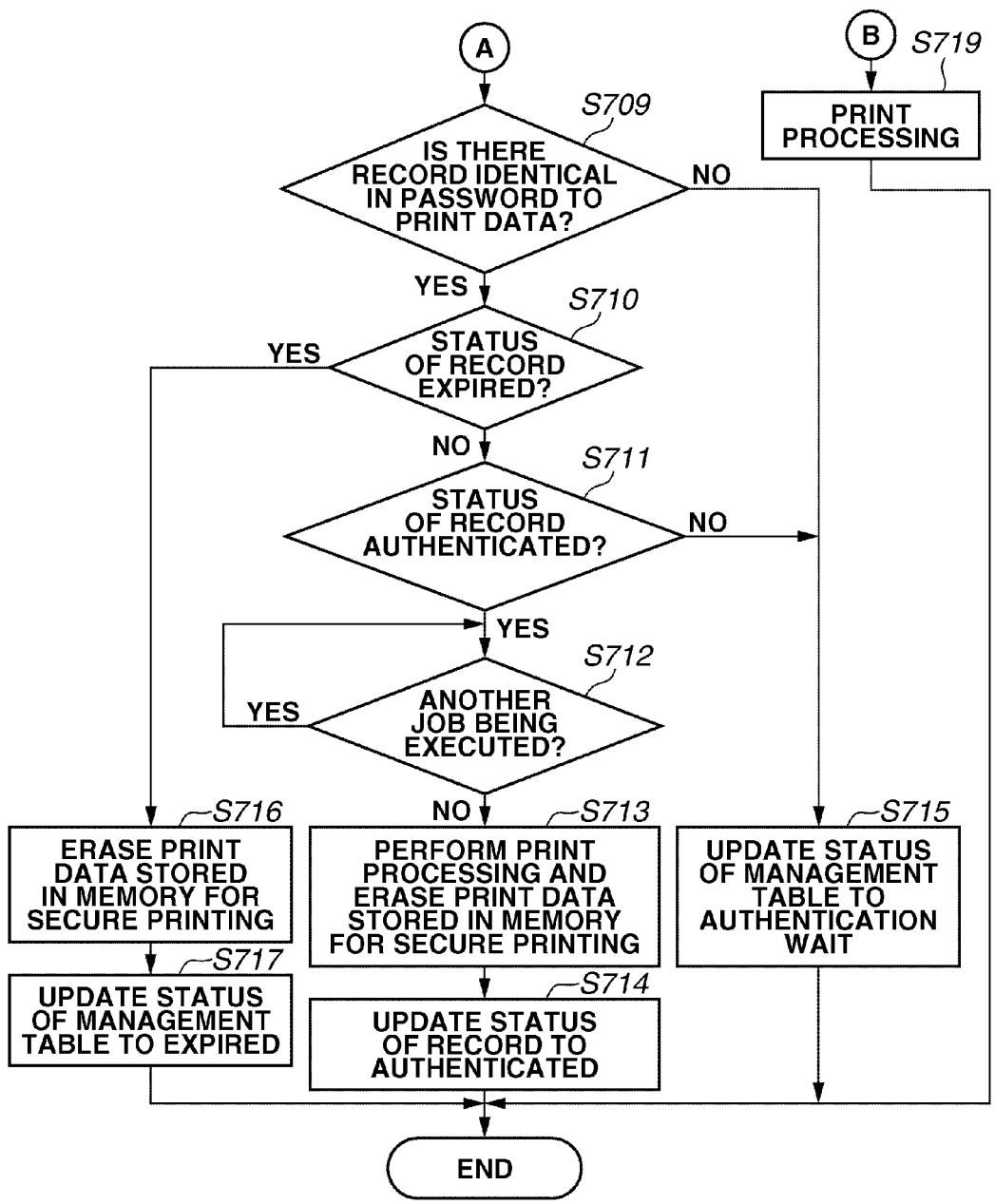

FIGS. 7A and 7B are flowcharts illustrating processing for receiving print data in the printing apparatus 200. Processing in each step illustrated in FIGS. 7A and 7B is implemented when the CPU 211 executes a program stored in the ROM 213 in the printing apparatus 200. The flowcharts illustrated in FIGS. 7A and 7B are started when the CPU 211 receives the print data relating to one or a plurality of print jobs, which is transmitted by the host computer 100 in step S610 illustrated in FIG. 6.

In step S701, the network interface 214 in the printing apparatus 200 receives the print data from the host computer 100. At this time, the network interface 214 also receives a document name, a user name, and other print settings together with the print data.

In step S702, the CPU 211 determines whether a password is added to the print data, which is received in step S701. The CPU 211 determines whether a print job relating to the print data is a secure print job or a non-secure print job based on a result of the determination. If the CPU 211 determines that the print job is the secure print job (YES in step S702), the processing proceeds to step S703. If the CPU 111 determines that the print job is the non-secure print job (NO in step S702), the processing proceeds to step S718.

In step S703, the CPU 211 determines whether the memory of the storage area 501 for secure printing is full. The CPU 211 refers to data, which has already been stored in the storage area 501 for secure printing in the RAM 212, to determine whether the memory is full depending on whether effective data that is a threshold value or more is stored. If the CPU 211 determines that the effective data that is the threshold value or more is stored in the storage area 501 for secure printing, the CPU 211 determines that the memory is full, in other words, the print data relating to the secure print job cannot be further reserved in the printing apparatus 200 (YES in step S703), and the processing proceeds to step S704.

For example, it is assumed that print data pieces relating to five secure print jobs with an identical password are generated in the host computer 100, as illustrated in FIG. 4, and the memory becomes full when the print data pieces relating to three of the five secure print jobs are stored in the printing apparatus 200. In this case, the print data pieces relating to three of the five secure print jobs with the identical password are stored in the printing apparatus 200. The print data pieces relating to the remaining two secure print jobs wait in the host computer 100 until the print data in the storage area 501 for secure printing is erased.

In step S704, the CPU 211 notifies the host computer 100 of a memory full error via the network interface 214. Further, the CPU 211 discards the print data, which is received in step S701.

In step S705, the CPU 211 monitors whether the memory full error is eliminated depending on whether the print data in the storage area 501 for secure printing is erased. The print data stored in the storage area 501 for secure printing is erased when print processing is completed by performing password authentication for the secure print job, which has already been reserved in the printing apparatus 200, for example. When the user issues an instruction to cancel the secure print job or when a time-out time provided for the secure print job has elapsed, the print data stored in the storage area 501 for secure printing is also erased. If the memory full error is not eliminated (NO in step S705), the process in step S705 is repeated.

If the memory full error is eliminated (YES in step S705), the processing proceeds to step S706. In step S706, the CPU 211 notifies the host computer 100 that the memory full error has been eliminated due to the above-described factor via the network interface 214, and prompts the user to transmit the print data again, which is received in step S701.

In step S707, the CPU 211 stores the print data with the password in the storage area 501 for secure printing. The CPU 211 stores the password, the document name, and the user name received together with the print data in the storage area 503 in the RAM 212, and uniformly manages them in a management table for managing secure print jobs.

The print data in the storage area 501 for secure printing is not rasterized and is stored in the PDL format until a password authentication operation is performed via the operation unit 220 later. When the print data is stored, the print data need not be stored in the PDL format, but bit map image data obtained by rasterizing the print data in the PDL format may be stored. By storing the bit map image data, a print product can be output immediately after the user issues an instruction to perform printing via the operation unit 220.

In step S708, the CPU 211 refers to a management table as illustrated in FIG. 8, which is managed by the printing apparatus 200.

FIG. 8 illustrates a management table for managing statuses of secure print jobs, which is stored in the RAM 212 in the printing apparatus 200. Respective values of records in the management table are stored in the storage area 503 in the RAM 212 illustrated in FIG. 5. A secure print job ID 801 is an identifier for identifying a print job relating to print data stored in the storage area 501 for secure printing. A document name 802, a user name 803, and a password 804 are respectively the document name, the user name, and the password of the print data corresponding to the secure print job ID 801, and are received together with the print data in step S701.

A reception time 805 is the time when the printing apparatus 200 receives the print data. If the host computer 100 divides the print data into a plurality of packets, and the printing apparatus 200 receives a plurality of print data pieces for the packets, the time when the print data is first received is stored. The CPU 211 periodically monitors each of the records in the management table. If a time-out time, which is determined in advance by the printing apparatus 200, has elapsed from the reception time 805 as a result of the monitoring, the print data specified by the secure print job ID is erased from the storage area 501 for secure printing.

A status 806 is status information indicating any one of four statuses "authentication wait", "authenticated", "expired", and "stop".

"Authentication wait" is status information indicating a state that a secure print job waits for password authentication.

"Authenticated" is status information indicating a state that password authentication is successfully performed and print processing is completed. While the management table manages the secure print job in the status 806 of which is "authenticated", the print data pieces that are identical in the document name, the user name, and the password can be printed without making the user input the password again. More specifically, even if the print data reaches the printing apparatus 200 later because the memory of the storage area 501 for secure printing is full, only the print data, which has been received in the above-described period, can be printed while a password input operation by the user is omitted.

"Expired" is status information indicating a state that print data is forcedly erased after a lapse of a predetermined time (the time-out time) from the reception time 805. The time-out time is an effective time, during which the print data is stored, previously set in the printing apparatus 200. While the record in the management table stores the secure print job in the status 806 of which is "expired", if the print data pieces that are identical in the document name, the user name, and the password are received, the received print data pieces are erased immediately (without waiting for the time-out time).

"Stop" is status information indicating a state that print data is erased without performing print processing because the user issues an instruction to cancel the secure print job via the operation unit 220. When the operation unit 220 issues an instruction to stop (cancel) the secure print job, print data relating to the secure print job is erased from the storage area 501 for secure printing, and the status 806 is updated to "stop".

The information of the status 806 is managed to perform, when print data to which the identical password is added is received from the host computer 100 later, predetermined processing (quasi-authentication, print data erasure, etc.) on the received print data.

An elapsed time 807 indicates a time elapsed since the status 806 was changed to any one of "authenticated", "expired", and "stop". Until the elapsed time 807 exceeds a predetermined time (e.g., 30 minutes), which has been set by the printing apparatus 200, after the authentication, the record is stored in the management table without being deleted. When the elapsed time 807 after the authentication exceeds the predetermined time, the record for the secure print job is deleted from the management table.

Return to the description of FIG. 7B. In step S709, the CPU 211 determines whether a record for a secure print job, which is identical to the print data, which is received in step S701 and is stored in the storage area 501 for secure printing in step S707, in the document name, the user name, and the password added thereto is stored in the management table illustrated in FIG. 8. If there is a record identical to the print data (YES in step S709), the processing proceeds to step S710. If there is no record identical to the print data (NO in step S709), the processing proceeds to step S715.

In the present exemplary embodiment, it is determined whether there is a record that is identical to received print data in all a document name, a user name, and a password added thereto. However, it may be determined whether there is a record that is identical to the received print data in only the user name and the password. It may be determined whether there is a record that is identical to the received print data in only the password.

In step S710, the CPU 211 refers to the status 806 of the record that is determined to be identical to the print data in step S709. The CPU 211 determines whether the status 806 of the record referred to is "expired" or "stop". If the CPU 211 determines that the status 806 of the record referred to is "expired" (YES in step S710), the CPU 211 determines that the print data to which the identical password is added have already been erased by a lapse of the time-out time. If the status 806 of the record is "stop" (YES in step S710), the CPU 211 determines that the print data to which the identical password is added have already been canceled (stopped) by a user's operation. If the status 806 of the record referred to is neither "expired" nor "stop" (NO in step S710), the processing proceeds to step S711.

In step S711, the CPU 211 refers to the status 806 of the record that is determined to be identical to the received print data in step S709, and determines whether the status 806 of the record is "authenticated". If the CPU 211 determines that the status 806 of the record is "authenticated" (YES in step S711), the print data to which the identical password is added have already been authenticated. Therefore, the print processing may be performed without making the user input the password again, and the processing proceeds to step S712. If the CPU 211 determines that the print data have not been authenticated, i.e., the status 806 of the record referred to is "authentication wait" (NO in step S711), the processing proceeds to step S715.

In step S712, the CPU 211 determines whether the printing apparatus 200 is executing another job (a non-secure print job, a copy job, an image transmission job, etc.). If another job is being executed (YES in step S712), data relating to the job that is being executed occupies the storage area 502 for non-secure printing. Therefore, the CPU 211 waits until the job that is being executed is completed so that the storage area 502 for non-secure printing can be used. If another job is not being executed (NO in step S712), the processing proceeds to step S713.

In step S713, the CPU 211 reads out the print data with the password stored in the storage area 501 for secure printing in the RAM 212, performs rasterization processing on the print data, outputs the print data to the printing unit 230, and performs image formation in the printing unit 230. When the print processing is performed in step S713, the print data read out of the storage area 501 for secure printing is copied onto the storage area 502 for non-secure printing. The CPU 211 releases a storage area for storing print data at a copy source, and uses a storage area at a copy destination, to perform print processing. This processing enables the storage area 501 for secure printing to receive print data that waits for transmitting (or may wait for transmitting) in the host computer 100 by quickly releasing the storage area 501 for secure printing.

In step S714, the CPU 211 sets the status 806 of the record in the management table illustrated in FIG. 8 to "authenticated", and the processing ends.

In step S715, the CPU 211 sets the status 806 of the record in the management table to "authentication wait", and the processing ends.

In step S716, the CPU 211 erases the print data stored in the storage area 510 for secure printing. The print data is erased without waiting until the time-out time has elapsed since it was received from the host computer 100.

In step S717, the CPU 211 updates the status 806 of the record in the management table corresponding to the print data, which is erased in step S716, from "authentication wait" to "expired", and the processing ends.

Processing in step S718 is performed when it is determined that the received print data is print data relating to the non-secure print job. In step S718, the CPU 211 stores the received print data in the storage area 502 for non-secure printing. When the print data relating to the non-secure print job is stored in the storage area 502, the memory of the storage area 502 may be full. This case is not the essence of the present exemplary embodiment, and hence the description thereof is omitted. In step S719, the CPU 211 causes the printing unit 230 to perform image formation based on the print data stored in the storage area 502 for non-secure printing, and the processing ends.

Figure 9:
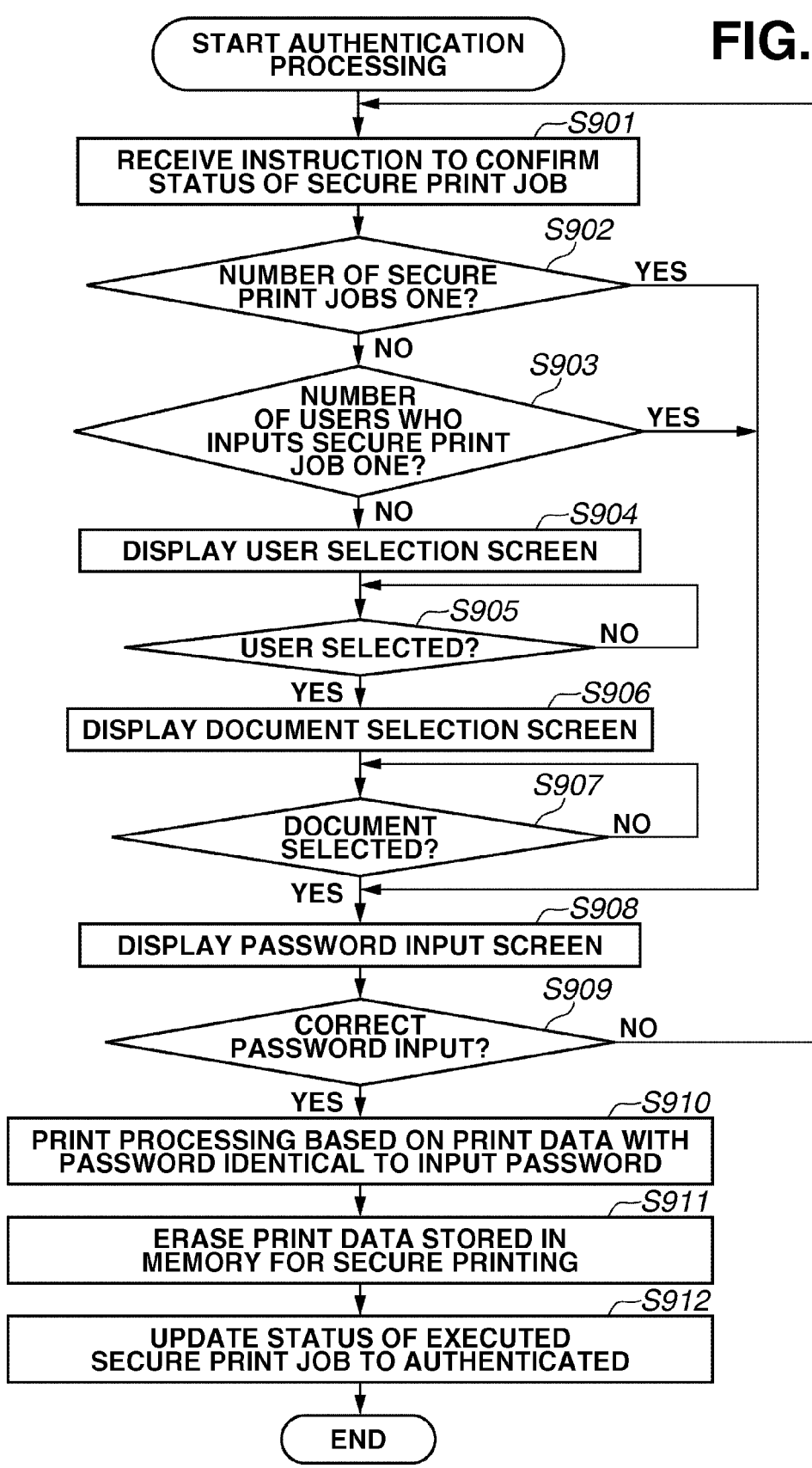
FIG. 9 is a flowchart illustrating processing for an authentication operation by a user in the printing apparatus illustrated in FIG. 1.

FIG. 9 is a flowchart illustrating password authentication processing for a secure print job in the printing apparatus 200. Processing in each step illustrated in FIG. 9 is implemented when the CPU 211 executes a program stored in the ROM 213 in the printing apparatus 200. The processing illustrated in FIG. 9 is started when a status confirmation key (not illustrated) in the operation unit 220 is pressed.

Figure 10:
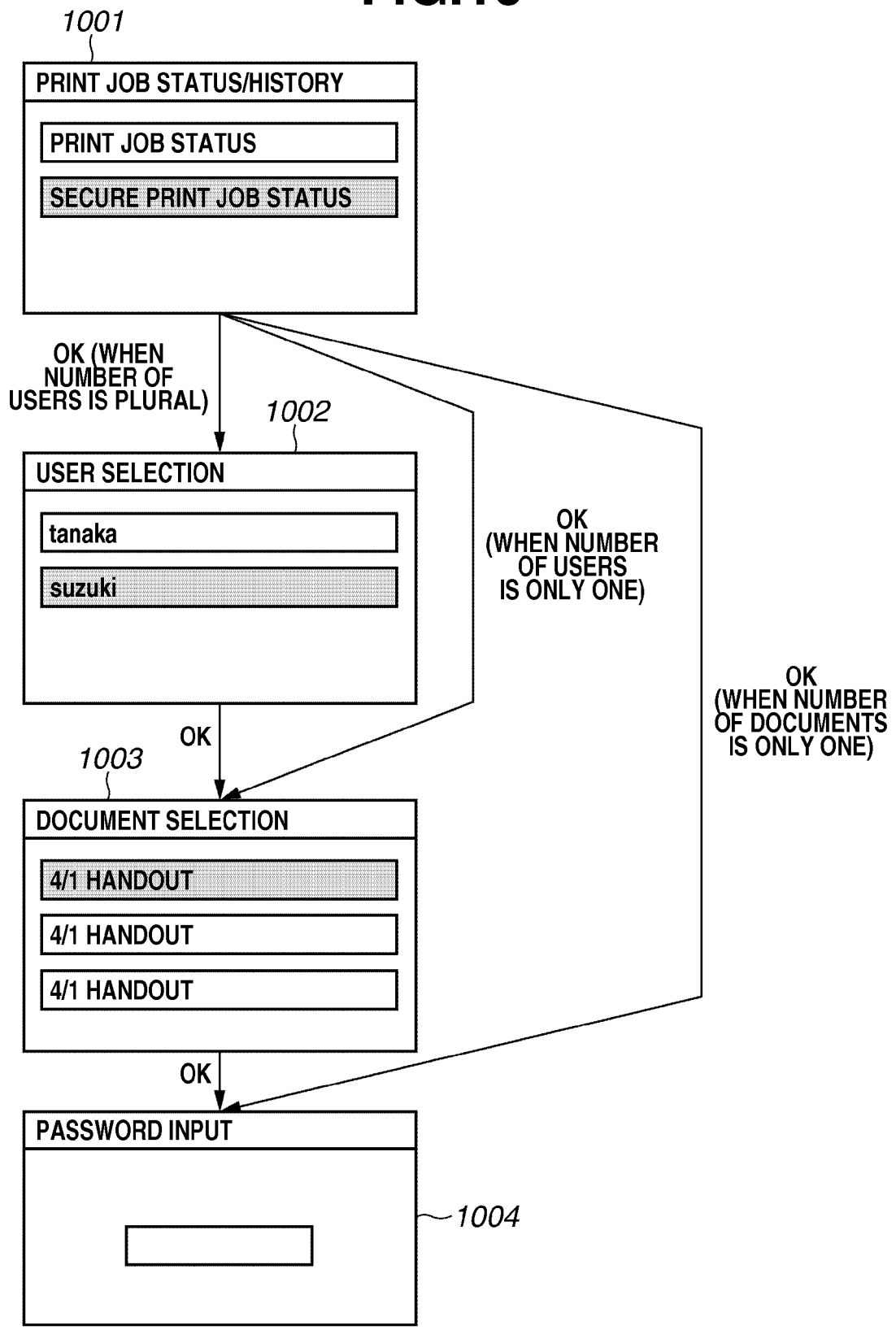
FIG. 10 illustrates authentication operation screens displayed on the printing apparatus illustrated in FIG. 1 and transition among the screens.

In step S901, the CPU 211 displays a screen 1001 illustrated in FIG. 10 when it accepts an instruction to confirm a status of the secure print job.

FIG. 10 illustrates screens 1001 to 1004 displayed on the operation unit 220 in the printing apparatus 200 and transition among the screens. A print job status and a secure print job status are displayed on the print job status/history screen 1001. If an up-and-down key (not illustrated) in the operation unit 220 is operated, and it is detected that an OK button is pressed while the secure print job status is selected, the processing proceeds to step S902. The secure print job status is displayed only when a secure print job in the status 806 in the management table of which is "authentication wait" is reserved in the printing apparatus 200.

In step S902, the CPU 211 determines whether the number of secure print jobs is only one or plural. The CPU 211 refers to the management table illustrated in FIG. 8, and checks whether the number of records that exist in the management table is one or plural, to make the above-described determination. If the number of secure print jobs is plural (NO in step S902), the processing proceeds to step S903.

On the other hand, if the number of secure print jobs is one (YES in step S902), the user is not required to select a user name and a document name. Therefore, the subsequent processing in steps S903 to S907 are omitted, and the processing directly proceeds to step S908. In step S908, the CPU 211 displays the password input screen 1004 illustrated in FIG. 10 on the operation unit 220.

In step S903, the CPU 211 refers to a column of the user name 803 of the record in the management table, and determines whether the number of users who have input the secure print job currently stored into the printing apparatus 200 is only one. If the CPU 211 determines that the number of users is plural (NO in step S903), the processing proceeds to step S904. In step S904, the CPU 211 displays the user selection screen 1002 on the operation unit 220. If the CPU 211 determines that the number of users is only one (YES in step S903), the user is not required to select the user name, and the processing directly proceeds to step S908.

In step S905, the CPU 211 determines whether the user selects the user name on the user selection screen 1002. If the CPU 211 detects that the user selects the user name (YES in step S905), the processing proceeds to step S906. In step S906, the CPU 211 displays the document selection screen 1003 corresponding to the user name.

On the document selection screen 1003 displayed in step S906, three items of a document name "4/1 handout" are arranged. More specifically, the printing apparatus 200 stores three print data to which the document name "4/1 handout" and a user name "suzuki" are added. In this example, it is assumed that the host computer 100 generates five print data pieces to which the document name "4/1 handout" and the user name "suzuki" are added. The printing apparatus 200 stores only three of the secure print jobs relating to the print data pieces to which the document name "4/1 handout" is added. Therefore, the remaining two secure print jobs wait until the storage area 501 for secure printing in the host computer 100 becomes empty, or enter a state where print data does not reach the printing apparatus 200 due to a delay on the network or the like.

In step S907, the CPU 211 detects whether any one of document names displayed on the document selection screen 1003 is selected by the user. If the CPU 211 detects that any one of the document names is selected (YES in step S907), the processing proceeds to step S908. In step S908, the CPU 211 causes the operation unit 220 to display the password input screen 1004, and prompts the user to operate an alphanumeric key (not illustrated) in the operation unit 220 to input a password.

In step S909, the CPU 211 determines whether the password input on the password input screen 1004 and the password added to the print data relating to the corresponding secure print job match each other. If the CPU 211 determines that the passwords match each other (YES in step S909), the processing proceeds to step S910. If the passwords do not match each other (NO in step S909), the CPU 211 displays a message indicating that the input password is not correct on the operation unit 220, and then the processing returns to step S901.

In step S910, the CPU 211 performs print processing based on the print data with the password, which is determined to be identical to the input password in step S909. If there is a plurality of print data pieces with the password, which is determined to be identical to the input password in step S909, the print data pieces with the password are collectively subjected to print processing. Accordingly, time and labor required to perform password authentication many times can be saved for the secure print jobs in which the identical password is set.

In step S911, the CPU 211 erases the print data after the print processing from the RAM 212. In step S912, the CPU 211 changes the status of the secure print job after the execution from "authentication wait" to "authenticated", and the processing illustrated in the flowchart in FIG. 9 ends.

Figure 11:
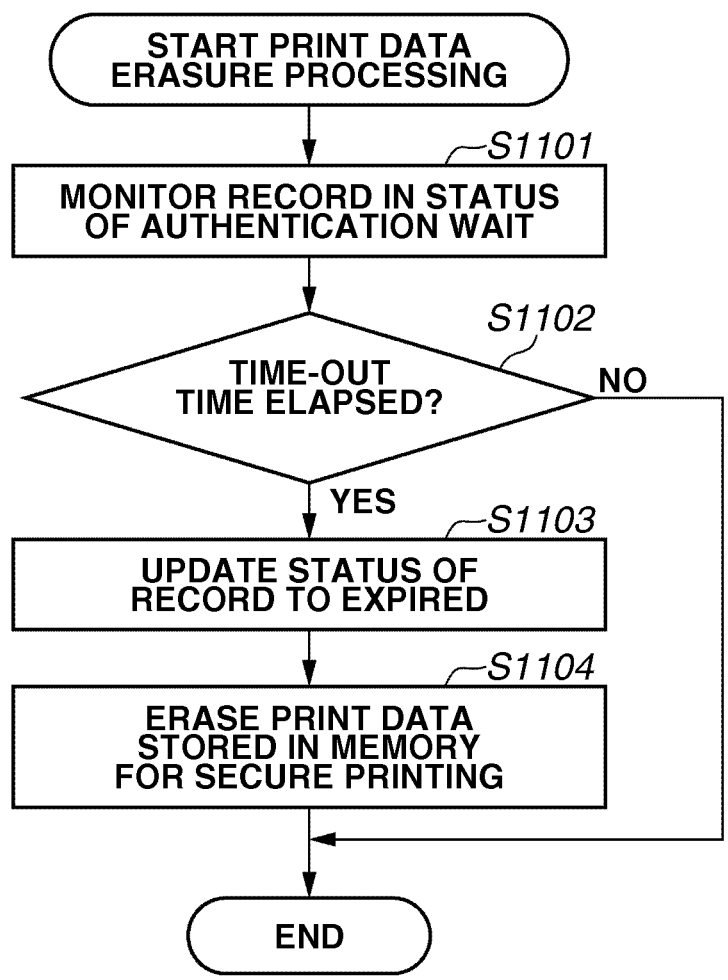
FIG. 11 is a flowchart illustrating processing for erasing print data stored in a storage area for secure printing illustrated in FIG. 5.

FIG. 11 is a flowchart illustrating processing for erasing print data relating to a secure print job in the printing apparatus 200. The processing illustrated in FIG. 11 is for erasing print data in the storage area 501 for secure printing when the time-out time has elapsed from the reception time 805 of the print data. Processing in each step illustrated in FIG. 11 is implemented when the CPU 211 executes a program stored in the ROM 213 in the printing apparatus 200. The processing illustrated in FIG. 11 is performed at a periodical timing (e.g., for each minute).

In step S1101, the CPU 211 monitors a record in the status in the management table illustrated in FIG. 8 of which is "authentication wait". In step S1102, the CPU 211 determines whether the reception time 805 of each record exceeds the time-out time, which has been previously determined in the printing apparatus 200.

If the CPU 211 determines that the time-out time has elapsed (YES in step S1102), the CPU 211 determines that an event to erase the print data occurs, and the processing proceeds to step S1103. In step S1103, the CPU 211 sets the status 806 of the record in the management table to "expired". In step S1104, the CPU 211 causes the printing unit 230 to erase the print data stored in the storage area 501 for secure printing.

FIG. 12 is a flowchart illustrating processing for deleting records in the management table illustrated in FIG. 8. In the present exemplary embodiment, each of the records in the management table illustrated in FIG. 8 is not deleted as long as the processing in the flowchart illustrated in FIG. 12 is not performed. This is because when print data to which an identical password is added is received after a lapse of a predetermined time, a status of a print job relating to the received print data is referred to. Processing in each step illustrated in FIG. 12 is implemented when the CPU 211 executes a program stored in the ROM 213 in the printing apparatus 200. The processing illustrated in FIG. 12 is also performed at a periodical timing, similarly to the processing illustrated in FIG. 11.

In step S1201, the CPU 211 refers to the management table illustrated in FIG. 8, to monitor the record in the status 806 of which is "authenticated" among the records for secure print jobs. In step S1202, the CPU 211 determines whether the elapsed time 807 after authentication of the monitored record exceeds a predetermined time. If the elapsed time 807 exceeds the predetermined time (YES in step S1202), the processing proceeds to step S1203. In step S1203, the CPU 211 deletes the record, and the processing ends.

As described above, according to the present exemplary embodiment, if password authentication for print data to which the identical password is added in the printing apparatus 200 is performed, the print data pieces can be collectively subjected to print processing by inputting the password once. Therefore, the user is not required to input the password many times.

Further, the secure print job for which the password authentication is completed once is managed as "authenticated" in the management table. Therefore, even if the printing apparatus 200 receives the print data to which the identical password is added later, the print processing can be performed without making the user input the password added to the print data again.

Further, a period during which the print processing can be performed without making the user input the password again when the print data to which the identical password is added is printed is limited to a predetermined period. Therefore, a situation where the print data pieces with the identical password are printed unlimitedly without making the user input the password can be suppressed.

Furthermore, according to the present exemplary embodiment, when a predetermined time (a time-out time) has elapsed since the print data relating to the secure print job was received from the host computer, the print data is set to be automatically erased. As a result, the storage area for secure printing in the RAM 212 need not be occupied for a long time.

After the time-out time has elapsed to erase the print data, if the remaining print data to which the same authentication information (password, etc.) is added is received from the host computer, the received print data is immediately erased without waiting for the time-out time. As a result, a situation where the remaining print data remains stored in the memory regardless of the print data being erased after an elapse of the time-out time can be prevented.

Furthermore, according to the present exemplary embodiment, when one of a plurality of secure print jobs generated by the number of print copies is canceled (stopped) by an instruction from a user, the remaining print job that is identical in the password to the canceled secure print job is also simultaneously canceled. Therefore, the secure print jobs (print data pieces) with the identical password need not be sequentially canceled (stopped). Even if the secure print job that is identical in the password to the canceled print job reaches the printing apparatus 200 after it is canceled, the print data can be appropriately erased.

According to the present exemplary embodiment, the host computer generates a plurality of print data pieces, to which an identical password is added, according to values set in the items such as the job type 201, the number of copies 202, and the sheet discharging method 207 on the operation screen illustrated in FIG. 2. However, the plurality of print data pieces need not necessarily be generated according to the set values. For example, the present invention is also applicable even if the generated print data is divided into a plurality of print data pieces based on its data size. In this case, each of the plurality of print data pieces divided into a predetermined data size is transmitted to the printing apparatus 200 after an identical password (authentication information) is added thereto. As another modified example, a plurality of print data pieces may be generated for each of a plurality of pages included in print data. In this case, the plurality of print data pieces generated for each page is transmitted to the printing apparatus 200 after identical authentication information is added thereto.

Aspects of the present invention can also be realized by a computer of a system or apparatus (or devices such as a CPU or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-278559 filed Dec. 14, 2010, which is hereby incorporated by reference herein in its entirety.

What is claimed is:

1. A print control system comprising a host computer and a printing apparatus, wherein the host computer comprises:
an acceptance unit configured to accept an instruction to print data generated by an application; and
a transmission unit configured to transmit to the printing apparatus a plurality of print data pieces to which an identical password is added based on the instruction accepted by the acceptance unit, and
the printing apparatus comprises:
a reception unit configured to receive at least one of the plurality of print data pieces transmitted by the transmission unit;
a storage unit configured to store the print data received by the reception unit;
an operation unit configured to accept input of a password from a user;
an image formation unit configured to perform image formation based on the print data in the storage unit, in response to matching between the password input from the user and the password added to the print data stored in the storage unit; and
a control unit configured to cause, once the identical password is input via the operation unit, the image formation unit to perform, if the reception unit receives another print data of the plurality of print data pieces to which the identical password is added, image formation based on the other print data without making the user input the password again via the operation unit,
wherein the control unit determines whether an elapsed time after the identical password is input via the operation unit exceeds a predetermined time and when the elapsed time exceeds the predetermined time the control unit deletes the print data.

2. The print control system according to claim 1, wherein the reception unit receives remaining data of the plurality of print data pieces transmitted by the transmission unit at least after the password is input from the user via the operation unit.

3. The print control system according to claim 1, further comprising a management unit configured to manage, if the password input via the operation unit and the password added to the print data stored in the storage unit match each other, status information indicating that authentication is completed in association with the identical password,
wherein the control unit performs control to cause, if the management unit manages the identical password to the password added to the remaining print data of the plurality of print data pieces transmitted by the transmission unit in association with the status information, the image formation unit to perform image formation based on the received remaining print data without making the user input the password again via the operation unit.

4. The print control system according to claim 3, wherein the storage unit stores, if the password added to the print data transmitted by the transmission unit and the password that is managed in association with the status information by the management unit do not match each other, the print data until a password is input via the operation unit.

5. The print control system according to claim 1, wherein the acceptance unit further accepts designation of the number of print copies of a print product to be discharged by the printing apparatus, and the plurality of print data pieces generated by the transmission unit corresponds to the number of print copies accepted by the acceptance unit.

6. A print control system comprising a host computer and a printing apparatus, wherein
the host computer comprises:
an acceptance unit configured to accept an instruction to print data generated by an application; and
a transmission unit configured to transmit to the printing apparatus a plurality of print data pieces to which an identical password is added based on the instruction accepted by the acceptance unit, and
the printing apparatus comprises:
a reception unit configured to receive at least one of the plurality of print data pieces transmitted by the transmission unit;
a storage unit configured to store the print data received by the reception unit at least until the storage unit accepts an instruction to perform printing from a user via an operation unit in the printing apparatus;
an operation unit configured to accept input of a password from a user;
an image formation unit configured to perform image formation based on the print data stored in the storage unit in response to matching between the password input from the user and the password added to the print data stored in the storage unit;
an erasure unit configured to erase, in a case that there occurs an event to erase the print data based on which the image formation is not performed, the print data stored in the storage unit; and
a control unit configured to cause, once the identical password is input via the operation unit, the image formation unit to perform, if the reception unit receives another print data of the plurality of print data pieces to which the identical password is added, image formation based on the other print data without making the user input the password again via the operation unit,
wherein the control unit is further configured such that after the erasure unit erases the print data stored in the storage unit, the erasure unit to erase, in a case that the reception unit receives the remaining print data of the plurality of print data pieces transmitted by the transmission unit, the received remaining print data, and
wherein the control unit determines whether an elapsed time after the identical password is input via the operation unit exceeds a predetermined time and when the elapsed time exceeds the predetermined time the control unit deletes the print data.

7. The print control system according to claim 6, wherein the event to erase the print data occurs when a time previously set to erase the print data stored in the storage unit has elapsed.

8. The print control system according to claim 6, wherein the event to erase the print data occurs when an instruction to erase the print data stored in the storage unit is accepted from the user via the operation unit.

9. The print control system according to claim 6, wherein the identical password is added to the plurality of print data pieces transmitted by the transmission unit, and
the image formation unit performs, if the password added to the print data stored in the storage unit and the password input via the operation unit match each other, image formation based on the print data to which the identical password to the input password is added.

10. A printing apparatus capable of communicating with a host computer, the printing apparatus comprising:
a reception unit configured to receive at least one of a plurality of print data pieces to which an identical password is added and which is transmitted by the host computer;
a storage unit configured to store the print data received by the reception unit;

an operation unit configured to accept input of a password from a user;

an image formation unit configured to perform image formation based on the print data in the storage unit, in response to matching between the password input from the user via the operation unit and the password added to the print data stored in the storage unit; and a control unit configured to cause, once the identical password is input via the operation unit, the image formation unit to perform, if the reception unit receives another print data of the plurality of print data pieces to which the identical password is added, image formation based on the other print data without making the user input the password again via the operation unit, wherein the control unit determines whether an elapsed time after the identical password is input via the operation unit exceeds a predetermined time and when the elapsed time exceeds the predetermined time the control unit deletes the print data.

* * * * *